United States Patent [19]

Harper et al.

[11] Patent Number: 5,046,025
[45] Date of Patent: Sep. 3, 1991

[54] DATA TRANSMISSION OPTIMIZER INCLUDING MULTI-PASS SYMBOL BUFFER OPTIMIZATION, TRIAL GENERATION FEATURE AND MDT RESET VOTING FEATURE

[75] Inventors: Thomas A. Harper, Sugar Land; Philip V. Wiles, Jr., Houston, both of Tex.

[73] Assignee: BMC Software, Inc., Sugar Land, Tex.

[21] Appl. No.: 517,963

[22] Filed: Apr. 30, 1990

Related U.S. Application Data

[63] Continuation of Ser. No. 225,036, Jul. 27, 1988, abandoned.

[51] Int. Cl.$^5$ .............................................. G06F 15/68
[52] U.S. Cl. ...................................... 364/518; 364/514
[58] Field of Search ...................... 364/514, 518, 521; 382/17

[56] References Cited

U.S. PATENT DOCUMENTS

| | | | |
|---|---|---|---|
| 4,620,289 | 11/1986 | Chauvel | 364/521 |
| 4,646,077 | 2/1987 | Culley | 340/750 X |
| 4,677,427 | 6/1987 | Komatsu et al. | 340/750 X |
| 4,691,295 | 9/1987 | Erwin et al. | 364/521 X |
| 4,750,137 | 6/1988 | Harper et al. | 374/364 |
| 4,789,963 | 12/1988 | Takahashi et al. | 364/521 X |

OTHER PUBLICATIONS

Ser. No. 948,150 Entitled: System for Supporting an Erase Input Key with Input Suppression in a System for Optimizing Data Transmission Associated with Addressable-Buffer Devices, Wiles et al., 2/31/86.

*Primary Examiner*—Dale M. Shaw
*Assistant Examiner*—Michael A. Jaffe
*Attorney, Agent, or Firm*—Arnold, White & Durkee

[57] ABSTRACT

A mapping-type data signal optimizer performs a multi-pass scan to optimize multiple-plane symbol buffers. A total of seven scanning passes of the difference map planes is made: A triple-plane scan in search of white characters; three dual-plan scans in search of turquoise, yellow, and pink characters, respectively; and three single-pass scans in search of red, blue, and green characters, respectively. This minimizes the length of the output signal required to effect the changes to the multiple planes. The optimizer performs an MDT-reset voting routine to determine whether selective setting of modified data tags (MDTs) can be done more effectively by (a) clearing all MDTs and individually setting desired MDTs, or (b) clearing desired MDTs. The approach resulting in the shorter signal is utilized.

8 Claims, 4 Drawing Sheets

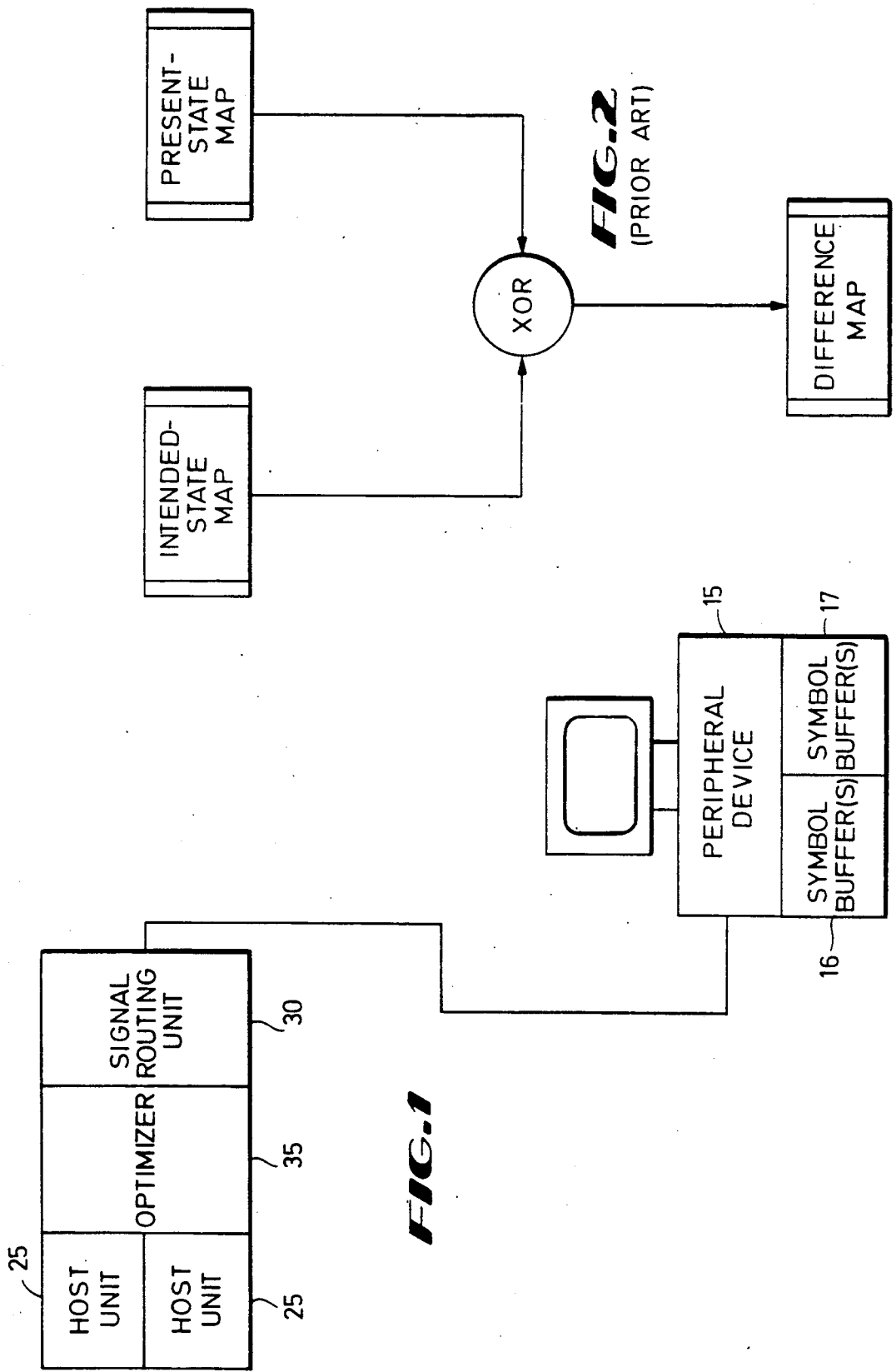

O = NULL CHARACTER
X = NON-NULL CHARACTER

DATA TRANSMISSION OPTIMIZER INCLUDING MULTI-PASS SYMBOL BUFFER OPTIMIZATION, TRIAL GENERATION FEATURE AND MDT RESET VOTING FEATURE

This is a continuation of Ser. No. 225,036, filed Jul. 27, 1988, now abandoned.

BACKGROUND OF THE INVENTION

Cross Reference to Related Applications

This application is one of five related co-pending applications filed simultaneously, namely: (1) Ser. No. 225,034, for Improved Data Transmission Optimizer, Including Query Suppression Feature, by Philip V. Wiles, Jr. and Thomas A. Harper; (2) Ser. No. 225,036, for Improved Data Transmission Optimizer, Including Multi-Pass Symbol Buffer Optimization, Trial Generation Feature, and MDT Reset Voting Feature, by Thomas A. Harper and Philip V. Wiles, Jr.; (3) Ser. No. 225,033, for Improved Data Transmission Optimizer, Including Dark-Field Elimination Feature, by Carol R. Harper and Philip V. Wiles, Jr.; (4) Ser. No. 224,922, for Improved Data Transmission Optimizer, Including Device-Specific Attribute Elimination, by Thomas A. Harper, Philip V. Wiles, Jr., and Carol R. Harper; and (5) Ser. No. 224,895, for Improved Data Transmission Optimizer, Including Programmable Symbol Code Point Sorting Feature, by Theodore R. Ernst and Thomas A. Harper. All of the foregoing applications are assigned to the assignee of this application.

This application is also related to Ser. No. 140,293, which is a continuation of Ser. No. 827,767, now U.S. Pat. No. 4,750,137, issued Jun. 7, 1988, to Harper et al., assigned to the assignee of this application and incorporated herein by reference (hereinafter the '137 patent).

This application is additionally related to co-pending Ser. No. 948,150, filed Dec. 31, 1986, by Wiles et al., now U.S. Pat. No. 4,837,679, issued Jun. 6, 1989, assigned to the assignee of this application (hereinafter the '150 application), also incorporated herein by reference.

This invention relates to improvements in a system for optimizing data transmissions such as that disclosed in the '137 patent.

Buffer Difference Mapping

Referring to FIGS. 1 and 2, the '137 patent and the '150 application disclose mapping-type optimizing systems for optimizing data exchanges between a host unit 25 (e.g., a data base application program running on a programmable computer) and a peripheral device 15 that has an addressable buffer (e.g., a terminal device). The addressable buffer may be a screen buffer 16 and/or one or more programmable symbol buffers 17.

Generally speaking, if the host unit 25 attempts to send any signal to the peripheral device 15 (e.g., a signal that would cause an erasure and a subsequent rewriting of the device's buffer), the optimizing system:

(1) intercepts or blocks the attempt;

(2) compares (i) a present-state map of the existing information contents of the buffer with (ii) an intended-state map of those information contents as expected to exist after receipt of the signal by the peripheral device 15;

(3) constructs a new signal that, instead of erasing and rewriting the buffer, "surgically" changes only those portions of the buffer that need changing; and (4) sends the new signal to the peripheral device 15 in place of the original signal from the host unit 25.

As shown in FIG. 2, the map comparison step generally consists of performing an exclusive-or (XOR) process, using the present-state map and the intended-state map as operands, to generate a difference map. In the difference map, null characters signify locations where the present-state map and the intended-state map are identical; non-null characters signify locations where they differ. From this information, the new signal is constructed.

Programmed Symbol Buffers

Many types of peripheral device 15 include one or more programmable symbol buffers 17, each of which has a specified number of memory blocks or "slots" for storage of bit-mapped symbol images. Typically, for example, a peripheral device 15 supporting the IBM 3270 protocol may include several symbol buffers; a host unit 25 can program any given slot with a specific bit-mapped symbol image.

The host unit 25 can then cause graphic shapes to be displayed on the peripheral device 15 by ordering particular symbol images (identified by "code point" designators) to be displayed at specific points on the screen of the peripheral device 15.

FIG. 3 shows an example of two slots in a programmed symbol buffer. A slot 46 contains a bit-mapped image of a straight vertical line; a slot 49 contains a similar image of an upward caret. A vertical arrow can be displayed on the screen of the peripheral device 15 by ordering the slot 46 to be displayed at two places on the screen, one above the other, with the slot 49 being displayed just above that.

Multi-Color Symbol Buffers

As shown in FIG. 4, some peripheral devices 15 have the capability to display symbols in color through the use of separate buffer planes for separate colors. For example, a peripheral device 15 may have a "red" plane, a "blue" one, and a "green" one. Various colors (see Appendix 10) can be displayed by setting selected bits in the appropriate planes; for example, a portion of a symbol can be displayed on the screen in white by setting the corresponding bits in all three color planes of the symbol buffer.

SUMMARY OF THE INVENTION

In accordance with the present invention, an optimizer performs additional optimization in conjunction with the optimization system of the '137 patent.

A QUERY SUPPRESSION routine is performed to suppress redundant device-capability queries sent by a host unit applications program 25 to a peripheral device 15. Whenever such a query command is initiated by the host unit applications program 25, the optimizer checks its own saved information to determine whether the information requested by the host unit has already been obtained. If so, the QUERY SUPPRESSION routine writes a minimal substitute query command. When the reply comes back from the peripheral device, the optimizer "fills in the blanks," using its previously stored information, to provide the reply signal expected by the host unit.

A READ BUFFER SUPPRESSION routine is performed to suppress commands requesting that the peripheral device 15 transmit the entire contents of its screen buffer 16 inbound. Whenever such a command is initiated by the host unit applications program 25, the optimizer checks its own saved information to determine whether the information requested by the host unit has already been obtained. If so, the READ BUFFER SUPPRESSION routine writes a minimal substitute command. When the reply comes back from the peripheral device, the optimizer "fills in the blanks," using its previously stored information, to provide the reply signal expected by the host unit.

The optimizer performs a multi-pass scan to optimize multiple-plane symbol buffers. A total of seven scanning passes of the difference map planes is made: A triple-plane scan in search of white characters; three dual-plan scans in search of turquoise, yellow, and pink characters, respectively; and three single-pass scans in search of red, blue, and green characters, respectively. This minimizes the length of the output signal required to effect the changes to the multiple planes.

A DARK FIELD ELIMINATION routine is performed: protected "dark" fields are overwritten with nulls in the present-state and intended-state maps, so that the contents of the dark fields are not included in the outgoing signal.

A DEVICE-SPECIFIC ATTRIBUTE ELIMINATION routine is performed: if the peripheral device 15 is not capable of displaying information in different attributes (e.g., some display devices are not capable of displaying data in a blinking manner), all such attributes in the present-state and intended-state maps are overwritten with nulls, so that the attributes are not included in the outgoing signal.

An MDT-reset voting routine is performed to determine whether selective setting of modified data tags (MDTs) can be done more effectively by (a) clearing all MDTs and individually setting desired MDTs, or (b) individually clearing desired MDTs. The approach resulting in the shorter signal is utilized.

For each triplet of non-null, null, and non-null character sequences in the map being scanned, the optimizer tests whether a shorter signal would result from (a) writing two separate subsignals, one for each of the non-null character sequences, or (b) writing a single signal encompassing all three sequences as a single concatenated sequence. The approach resulting in the shorter signal is utilized.

A present-state list of values of programmed symbols already downloaded to a peripheral device 15 is sorted, and a similar intended-state list of programmed symbols intended to be downloaded is likewise sorted. A search is performed to detect any commonalities that might exist between the present-state and intended-state programmed-symbol values, even under differing programmed-symbol designators. When such a commonality is detected, the intended-state designator is altered to be equal to the present-state designator; thus, that particular programmed symbol value need not be redownloaded.

BRIEF DESCRIPTION OF THE DRAWINGS

FIG. 1 is a simplified block diagram of a typical host unit applications program as used in a telecommunications system, having an optimizer in accordance with the present invention interposed between the applications program and a signal routing unit.

FIG. 2 is a block diagram of the exclusive-or (XOR) process used in the '137 patent to generate a difference map signifying changes in a buffer of a peripheral device.

Throughout the following description, like numerals refer to like parts in all drawings.

DETAILED DESCRIPTION OF SPECIFIC EMBODIMENTS

Figure 3:
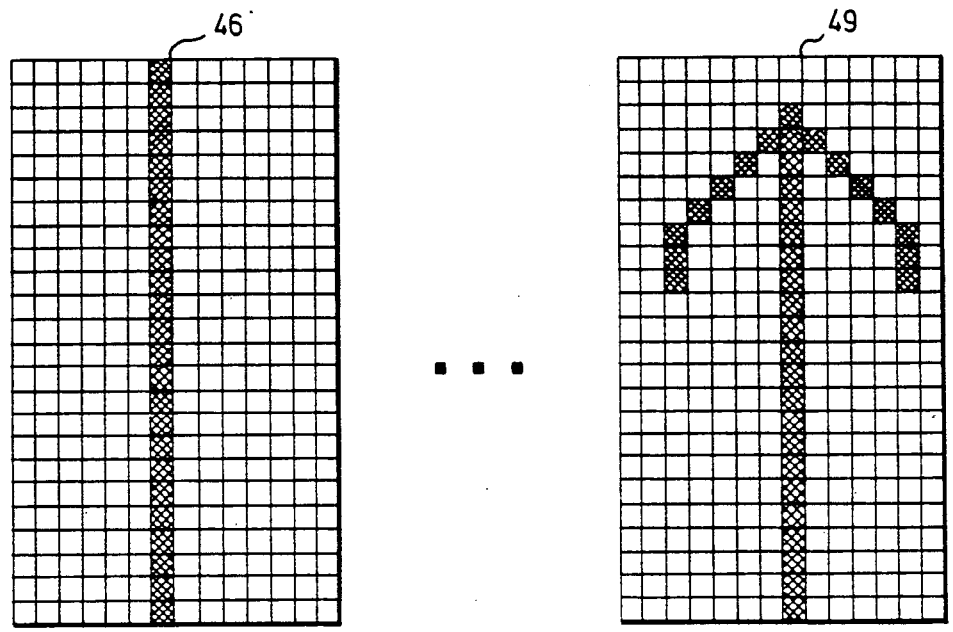
FIG. 3 is a sketch of two programmed symbol buffer slots.
Figure 4:
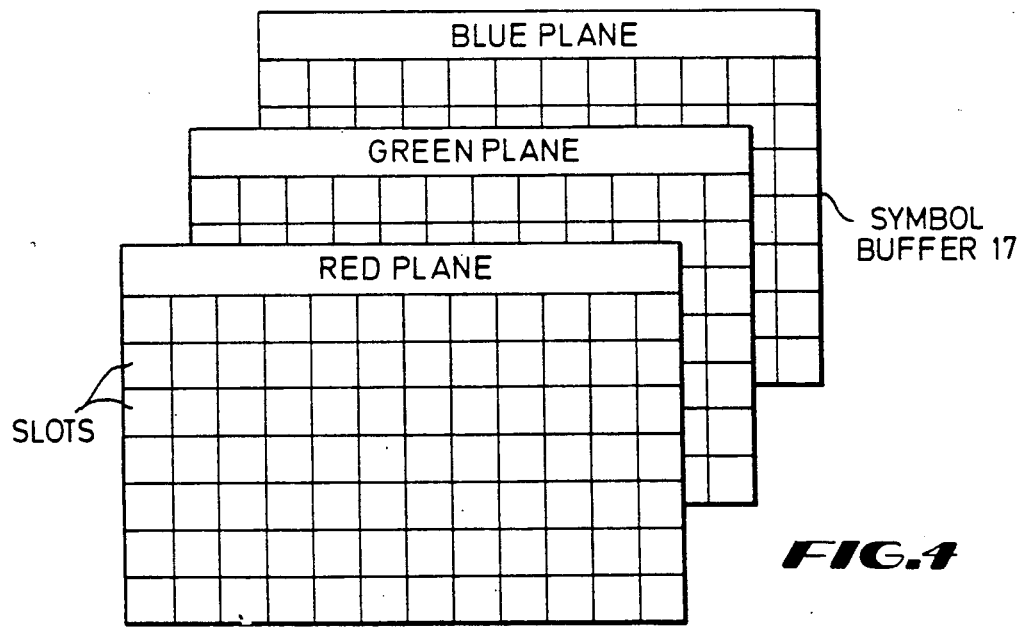
FIG. 4 is a sketch of an arrangement of three color-related buffer planes in a programmed symbol buffer.
Figure 5:
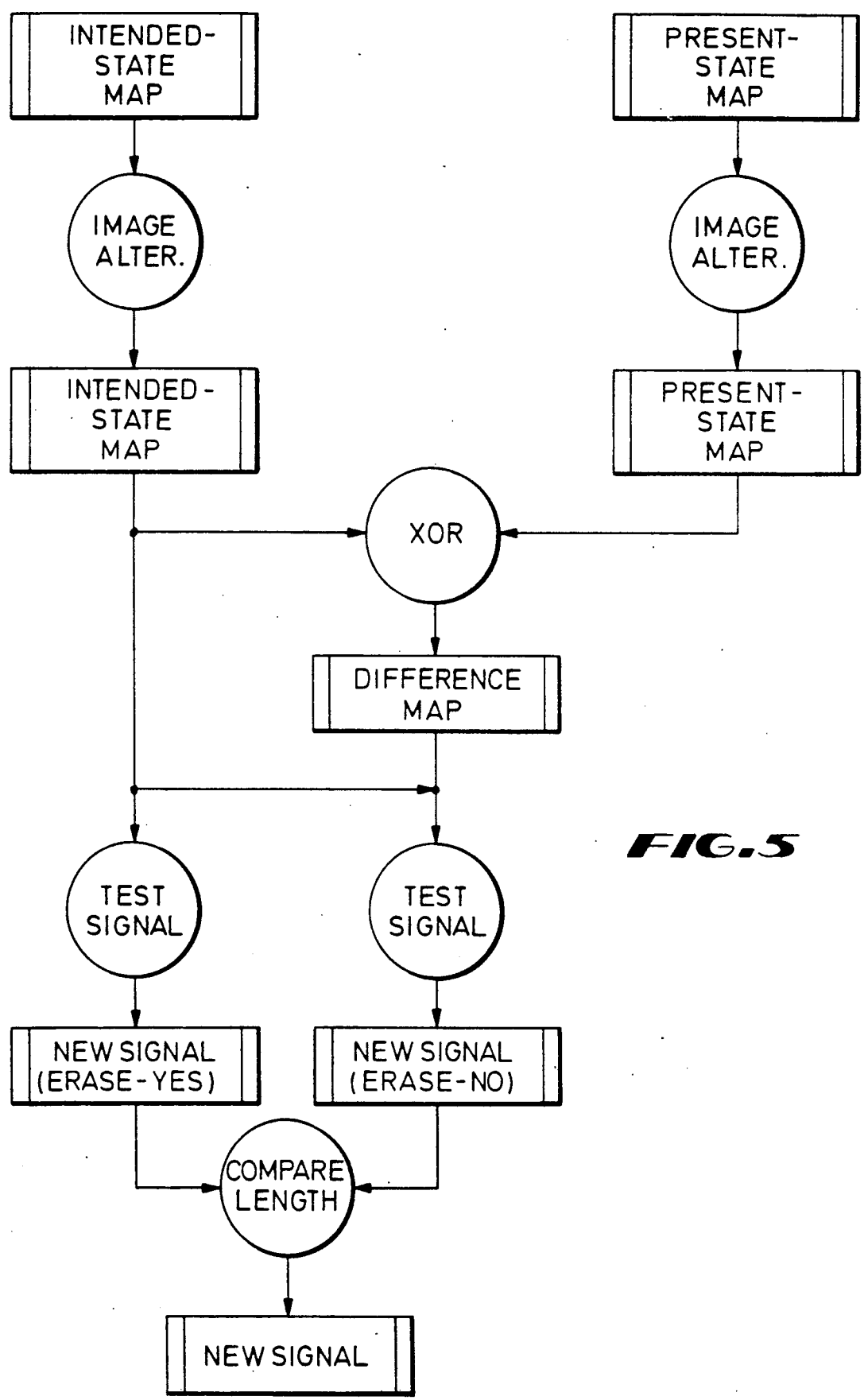
FIG. 5 is a diagrammatic overview of certain processes in accordance with the invention.

Referring to FIG. 1, a telecommunications system is shown in which incoming and outgoing signals are exchanged between a peripheral device 15 and a host computer 20. (An incoming signal is defined here as a signal transmitted from the peripheral device 15 to the host computer 20, and vice versa.) The peripheral device 15 includes a screen buffer 16 and one or more programmable symbol buffers 17.

The host computer 20 typically executes multiple computer programs substantially concurrently (e.g., in a multi-programming environment such as provided by the IBM MVS system). As shown in FIG. 1, the host computer 20 executes host unit application programs 25 and a signal-routing unit program 30 which handles communications between the host computer 20 and the peripheral device 15.

An optimizer 35 monitors communications between the host units 25 and the peripheral device 15 by intercepting incoming and outgoing signals. As shown in FIG. 1, the optimizer 35 is interposed between the host units 25 and the signal-routing unit 30.

Pseudocode Appendixes

The optimizer 35 may be implemented by programming the host computer 20 to perform the functions described herein as shown in FIG. 1. For purposes of illustration, the discussion below refers periodically to programming of a computer operating in conjunction with the well-known IBM 3270 communications protocol and MVS operating system.

Alternatively, of course, the optimizer 35 could be implemented in, or as, a machine separate from the host computer 20, interposed between the host computer 20 and the peripheral device 15.

Appendixes 1 through 30 set forth a generalized pseudo-code outline, in a "structured English" format, of an exemplar design for a computer program in accordance with the invention. The pseudocode is intended as a general description and is not meant to be limiting. For example, it uses the term "data structure" somewhat loosely, to describe generically a simple variable in memory, a complex data structure, a disk file, or other means for storing data.

For convenience of illustration, the pseudocode is broken down into a number of routines. However, those skilled in the art will appreciate that some of the routines may be combined, and others may be broken down still further.

The actual optimum organization and structure of an computer program in accordance with the invention will depend greatly on the characteristics of the system on which the invention is implemented. Certain functions described in the pseudocode may not be available on a given machine and must be simulated; or, a group of functions described here may be able to be collapsed into fewer functions on another machine.

The pseudocode is only an outline and does not necessarily set forth a complete program listing. For example, testing for boundary conditions is sometimes described explicitly in the pseudocode and sometimes is referred to only implicitly. By and large, the pseudocode does not set forth error trapping/handling or similar functions.

It will be recognized by those of ordinary skill that, given the benefit of this disclosure, the implementation of an optimizer 35 on any given model of computer running any given operating system, to take advantage of the features of the computer and operating system, is a matter of conventional programming by those familiar with the particular computer and operating system.

General Approach

The general design approach of the optimizer 35 for outgoing signals may be described as follows: an outgoing signal generated by a host unit applications program 25 is parsed into what may be termed component parts. Commands in the outgoing signal that would affect the screen buffer 16 are processed, and substitute component-part commands are generated. Likewise, commands affecting any symbol buffers 17 are processed, and substitute component-parts for those commands are generated. Finally, a substitute signal is constructed from the substitute component parts.

Query Suppression

Some telecommunications protocols (e.g., the IBM 3270 protocol) permit a host unit 25 to use a query command to interrogate the peripheral device 15 as to the peripheral device's characteristics (e.g., screen colors supported, symbol buffer availability, etc.). Upon receipt of such a query, the peripheral device 15 responds with a signal specifying the requested information.

Some host units 25 may be programmed to send such a query with every outgoing signal. This can result in needless repetitive transmission of the same requested information.

To reduce such repetitive transmissions, the optimizer 35 may include a QUERY SUPPRESSION routine, e.g., as is set forth in Appendix 4.

As shown in Appendix 4, when a host unit 25 generates a query signal, the QUERY SUPPRESSION routine checks whether the requested information has already been received. If not, the optimizer 35 passes the query signal on unchanged. When the response to the query signal is received from the peripheral device 15, the optimizer 35 saves the contents of the response. (See Appendix 30.)

Upon subsequent query signals to the same peripheral device 15, the optimizer 35 in essence converts the query (see Appendix 4). In an IBM 3270-type system, for example, a query signal may be a READ PARTITION QUERY command. If the requested information about the peripheral device 15 has already been received, the QUERY SUPPRESSION routine converts this command to a READ PARTITION QUERY LIST NULL command. Upon receipt of the peripheral device 15's response to the query signal, the optimizer 35 converts the response to conform to the query signal initiated by the host unit 25.

Read Buffer Suppression

Some telecommunications protocols allow a command to be transmitted to a peripheral device 15 that causes the peripheral device 15 to transmit inbound the entire contents of the device's screen buffer 16 (and perhaps the contents of its symbol buffer(s) 17). In the IBM 3270 protocol, for example, the READ BUFFER command performs this function.

If the contents of the screen buffer 16 are already available, such a command results in inefficient use of telecommunications resources. The optimizer 35 may include a READ BUFFER SUPPRESSION routine, e.g., as shown in Appendixes 5 and 30, to suppress such commands. The operation of this routine is generally like that of the QUERY SUPPRESSION routine discussed above.

Triple-Pass Symbol Buffer Optimization

The optimizer 35 may include routines to optimize signals directed to programmable symbol buffers. One such routine, SYMBOL BUFFER COMMAND PROCESSING, is set forth in Appendixes 6 through 12.

The SYMBOL BUFFER COMMAND PROCESSING routine operates generally in the manner of the optimizing system of the '137 patent; it includes an advantageous approach to handling devices that support multiple color-plane loading.

The SYMBOL BUFFER OPTIMIZATION routine (called by the SYMBOL BUFFER COMMAND PROCESSING routine) performs its optimizing scanning of three difference-map color planes (red, blue, green) in a manner to minimize the size of the outgoing data signal. (Scanning of difference maps is done to locate points where the intended state of the peripheral device 15's buffers differ from the present state of those buffers, i.e., where changed-character sequences exist.)

The SYMBOL BUFFER OPTIMIZATION routine performs a total of seven scanning passes: a triple-plane pass to pick up all three-color (i.e., white) changed-character sequences; three successive dual-plane passes to pick up all two-color (turquoise, yellow, pink) changed-character sequences; and three successive single-plane passes to pick up all one-color (red, green, blue) changed-character sequences.

This approach may result in longer computation time than a single scan of each of the three planes. However, it can advantageously minimizes the number of commands (e.g., LOAD PROGRAMMED SYMBOLS structured fields in the IBM 3270 protocol) that must be written. In the IBM 3270 protocol, for example, for a white changed-character sequence, a single LOAD PROGRAMMED SYMBOLS structured field can include a command which specifies changing all three color planes at that address. This is advantageous over scanning each plane separately, where three separate such structured fields (one for each color plane) must be written for a white changed-character sequence.

Symbol-Sorting Optimization

Sorting of a programmed symbol set in order of symbol value, prior to optimization as described above, is sometimes advantageous. The advantage arises when (1) a host unit 25 orders the downloading of a programmed symbol set to a peripheral device 15, (2) many of the programmed symbol bit-mapped images are the same as before, but (3) the still-the-same images are designated for storage in different slots within the peripheral device 15's symbol buffer than before. Without sorting, a programmed symbol image is wastefully downloaded to a peripheral device 15, even though the same image is already present at the device in a different slot within the symbol buffer.

The sorting process (not shown in the Appendixes) is accomplished by creating (1) a map of the present state of the bit-mapped symbol images stored in the different slots of the symbol buffer, identified by slot designator; and (2) a similar map of the symbol buffer as it would exist after receipt of the outgoing signal generated by the host unit 25.

The maps are then searched for possible commonality of bit-mapped symbol images between pairs of slots in the respective maps. For example, a slot 5 in the present-state map may contain the same bit-mapped symbol image as a slot 8 of the intended-state map. Retransmission of this symbol image would be wasteful of telecommunications resources.

It will likely be advantageous to sort each map, e.g., in ascending order of symbol value, prior to commencing the search. (The pattern of on- and off bits in the bit-mapped symbol image can be treated as a binary symbol value and sorted accordingly.)

A variety of search techniques may be used, as will be appreciated by those of ordinary skill having the benefit of this disclosure. For example, the value of a symbol image in the sorted intended-state map may be used as the search target in a scan of the present-state map; if the scanned values in the present-state map become greater than the value of the target, the search has failed as to that target.

Whenever such commonalities (and potential waste) are found, the optimizer 35 substitutes the existing slot designator (slot 5) in the new outgoing signal in place of the slot designator specified by the host unit 25 (slot 8). This substitution causes designator conflicts if the host unit 25 also used the existing slot designator (slot 5) to designate a different symbol image; a suitable hashing-type algorithm is therefore used to prevent such conflicts.

Image Alteration—General Description

The optimizer 35 may alter the map(s) of the screen buffer 16 to permit implementation of additional optimization techniques. (See Appendixes 16-21.) Generally, this alteration entails overwriting certain fields in the map of the intended information content of the screen buffer 16 to permit more efficient information transmission.

Both the present-state map (which represents the information content of the peripheral device 15's buffers as "perceived" by the host unit application program 20) and the intended-state map are so altered just prior to the exclusive-or generation of a difference map (see FIG. 2). For integrity purposes, the only fields that are so altered are protected fields (i.e., fields that cannot be modified by a user at the peripheral device 15).

Specific alterations to the map are discussed in more detail below.

Blank-to-Null Conversion

One of the routines that may be called by the IMAGE ALTERATION routine is the BLANK-TO-NULL CONVERSION routine (Appendix 17).

Blanks and nulls usually have the same appearance (i.e., no appearance at all) on a display screen. Therefore, if a run of characters to be transmitted to a peripheral device 15 consists entirely of intermingled blanks and nulls, it is advantageous to convert the run to a homogeneous sequence, thus allowing the use of a repeat-to-address command.

(As those of ordinary skill are aware, a repeat-to-address command instructs the peripheral device 15 to display a specified number of a particular character, usually at a savings in signal length. For example, such a command may require 5 characters to instruct the peripheral device 15 to display 27 consecutive spaces, plainly a savings of 22 characters in the signal.)

To this end, the BLANK-TO-NULL CONVERSION routine converts all protected-field blanks in the map of the screen buffer 16 to nulls.

An exception is made in certain systems in order to maintain transparency with certain screen-print routines. In such systems, when a screen is printed, the printing of lines on the screen having no characters other than nulls is suppressed. Thus, if a screen is displaying 25 lines, and one line contains all nulls, that line would not be printed.

To maintain transparency, the BLANK-TO-NULL CONVERSION routine keeps track of screen line boundaries. If a line on a screen consists entirely of characters which would be converted to nulls, and at least one blank character, then at least one blank character is left in the intended-state map at a location "on" that line. Thus, if the screen image resulting from the outgoing signal generated by the optimizer 35 is printed, the printed screen image will reflect null-line suppression if and only if the outgoing signal initiated by the host unit applications program 25 would have produced such a screen image.

Dark Field Elimination

Another image-altering routine may be a DARK FIELD ELIMINATION routine (Appendix 18).

Figure 6:
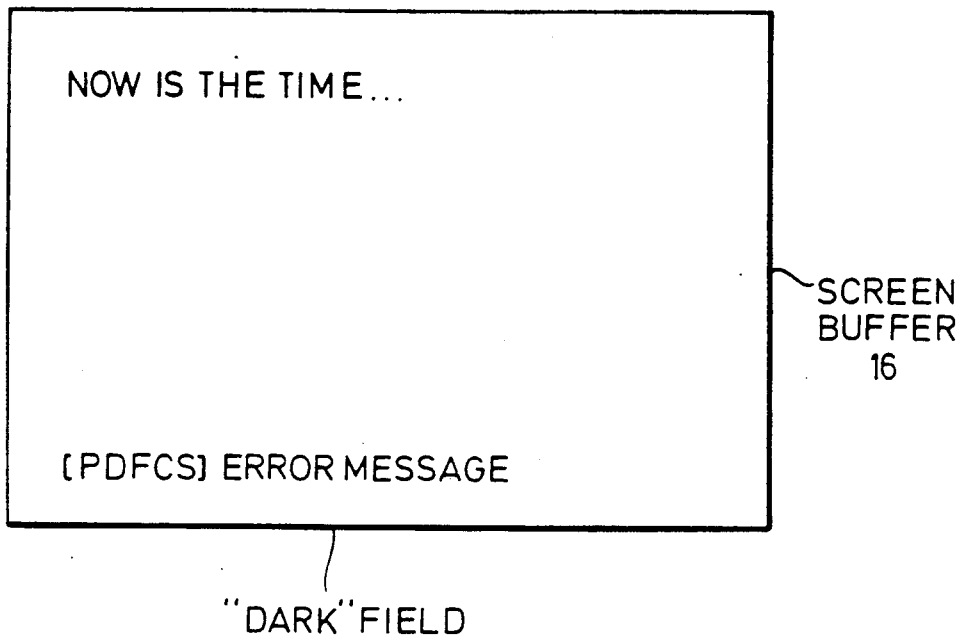
FIG. 6 is a simplified representation of the contents of a screen/buffer with a "dark field" included.

Some host unit application programs 25 include one or more "dark fields" in an outgoing signal. As shown in FIG. 6, a dark field is typically a string of characters (e.g., an error message) that are downloaded to a peripheral device 15 for writing to the screen buffer 16, but are delimited by a non-display field attribute (shown as PDFCS in FIG. 6).

The characters in the dark field are thus present in the screen buffer 16. Because of the non-display attribute, however, they are not visible on the screen of the peripheral device 15.

A dark field can be activated, so to speak, by overwriting the non-display attribute with a suitable display attribute (e.g., an attribute that causes the error message, already in position, to be suddenly displayed in flashing characters, in red, etc.). If a host unit application program 25 is also designed to refresh the screen buffer 16 every time an outgoing signal is transmitted, then the repetitive transmission of such a dark field is inefficient.

The optimizer 35 may be designed to perform a DARK FIELD ELIMINATION routine (Appendix 18) to prevent any transmission of a protected dark field.

The dark field may subsequently be activated by the host unit 25 through initiation of a suitable outgoing signal. It will be apparent to those of ordinary skill having the benefit of this disclosure that in this event, the dark field will appear in the difference map as a sequence of non-null characters. Its contents will therefore be transmitted to the peripheral device 15 as part of the new outgoing signal constructed by the optimizer 35.

Field Merge

A FIELD MERGE routine may be called by the IMAGE ALTERATION routine.

As shown in Appendix 19, if two successive protected fields have the same field attribute byte, the field attribute byte for the second protected field is redundant and can be eliminated.

Device-Specific Attribute Elimination

For some peripheral devices 15, e.g., printers, the attribute byte essentially serves no purpose. The DEVICE SPECIFIC ATTRIBUTE ELIMINATION routine (Appendix 20) checks previously-stored information (see INITIALIZATION (OUTGOING) routine, Appendix 2) to determine whether the peripheral device 15 associated with the particular communications session requires attributes. If no attributes are required, the routine overwrites all character sequences designating such attributes with nulls.

Null Field Attribute Elimination

A NULL FIELD ATTRIBUTE ELIMINATION routine (Appendix 21) may be called by the IMAGE ALTERATION routine.

As noted above, null characters ordinarily are not visible on a screen. Thus, if a protected field consists of nulls (e.g., which may result from the BLANK-TO-NULL CONVERSION routine), any attributes defining the field are superfluous, provided of course that the attribute does not follow (and therefore delimit) an unprotected field. For example, nulls do not appear as bright characters, and so therefore a bright attribute for a null field is surplusage in an outgoing signal.

The NULL FIELD ATTRIBUTE ELIMINATION routine searches the map in question and overwrites any attribute bytes for null fields with null characters.

MDT Reset Voting

A RESET-MDT VOTING routine (Appendix 22) may be called from the IMAGE ALTERATION routine. To be precise, the RESET-MDT VOTING routine does not involve alteration of a buffer map, and therefore may equally well be called from the MAIN (OUTGOING) routine.

Additional background information can appropriately be mentioned here. As described in more detail in the '137 patent, an MDT is typically a specific bit flag within a field attribute byte. This flag is ordinarily set when the associated field is modified; it may also be preset by a host unit application program 25 as part of an outgoing data signal (thus "premodifying" the associated field as premodified). If a field is premodified, the peripheral device 15 will transmit its contents inbound whether or not the user of the peripheral device 15 has actually modified the field.

Some protocols (e.g., the IBM 3270 protocol) provide that an MDT at a peripheral device 15 remains set until cleared. The MDT can typically be cleared either by an MDT reset command or by a buffer-erase command, in either case transmitted outbound by a host unit applications program 20.

Thus, once a field is modified (or premodified), its contents will be transmitted inbound with every subsequent inbound signal—whether or not those contents have been modified in connection with the subsequent signals after the first one—until the MDT is cleared. In effect, such a field, with a left-over MDT that remains, becomes "premodified" with respect to all subsequent signals until the MDT is cleared.

As described in the '137 patent and the '150 application, the optimizer 35 clears the MDT for certain premodified fields. This may require the optimizer 35 to generate a signal to clear any left-over MDTs that remain set.

The MDT-reset command is a quick, cheap, brute-force way to clear all MDTs at the peripheral device 15. Its use may result in a net increase in the size of the outgoing signal, however: in some circumstances, certain MDTs must remain set, and so if an MDT-reset command is used, those MDTs must be set again.

It may be that more MDTs are to be set again after an MDT-reset command than would need to be cleared if an MDT-reset command were not used. In such a situation, the size of the outgoing signal is likely to be shorter if an MDT-reset command is not used.

The RESET-MDT VOTING routine (Appendix 22, 24) permits selective use of the MDT reset command. The routine examines all field attribute bytes in the present-state and intended-state maps of the screen buffer 16. It counts the state changes, if any, between the present state and the intended state, of the MDTs in the various field attribute bytes.

If fewer MDTs go from set to cleared than from cleared (or set) to set, then a shorter data stream will result from not using an MDT-reset command, and instead individually clearing the desired MDTs. Conversely, if more MDTs must be cleared than set, it more economical to use an MDT-reset command, and then to individually set again any MDTs that need it.

Signal Generation (Screen)

When image alteration is complete, the optimizer 35 performs a SIGNAL GENERATION (OUTGOING-SCREEN) routine (Appendix 23). This routine makes two successive calls to a TEST SIGNAL routine, which generates two test signals for potential transmission to the peripheral device 15; the shorter of the two signals is ultimately transmitted.

The first call to the TEST SIGNAL routine is preceded by the writing of an erase-buffer command to the first test signal. This means that the first test signal must completely rewrite the screen buffer 16 with the contents of the intended-state map.

The second call to the TEST SIGNAL routine is not preceded by writing an erase-buffer command. In the second test signal, therefore, every character sequence in the screen buffer 16 that is to be changed must be individually modified with a set-buffer-address and a write command.

Before making these calls to the TEST SIGNAL routine, the SIGNAL GENERATION (OUTGOING-SCREEN) routine performs an MDT-RESET VOTE COUNT routine (Appendix 24) to determine whether or not to use an MDT-reset command.

Test Signal Generation

Figure 7:
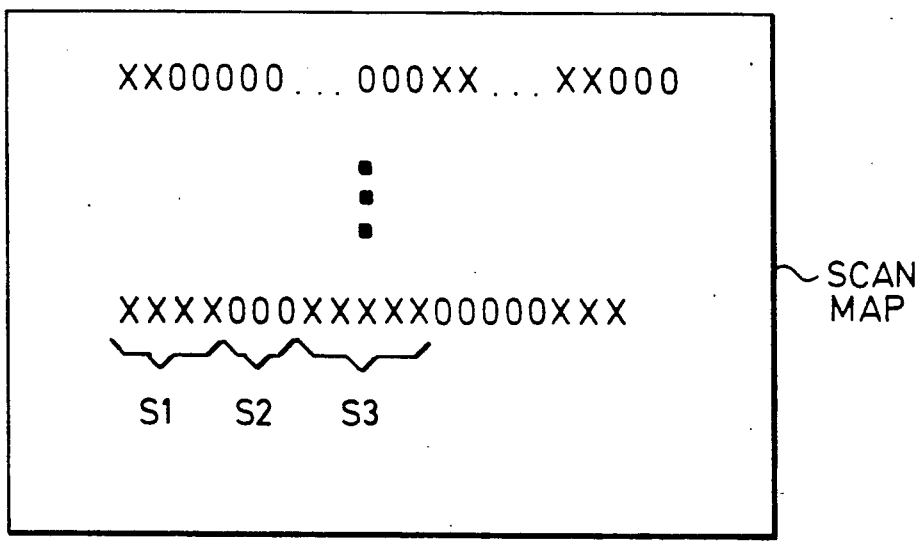
FIG. 7 is a simplified representation of a scan map as used in the TEST SIGNAL routine (Appendixes 25-27).

The TEST SIGNAL routine (Appendix 25) may call a NULL/NON-NULL STRING DELIMITATION routine (Appendix 26) to scan the intended-state map (if an erase-buffer command is used) or the difference map in search of triplets of character sequences S1, S2, and S3. As shown in FIG. 7, each such triplet consists of two sequences S1 and S3 of non-null characters separated by a sequence S2 of null characters.

The TEST SIGNAL routine then may call a TRIAL GENERATION routine (Appendix 27) to generate two trial signals for each triplet so located. In the first trial signal, the TRIAL GENERATION routine treats the triplet as a single character sequence: it calls an OUTPUT STRING GENERATION routine (Appendix 28) to write a single set-buffer-address command for the triplet, then copy all characters (both non-null and null) from the map being scanned to the trial signal. As explained in the '137 patent, all characters in the map that represent a field attribute or other code sequence are reconverted back to the proper code sequence in the process.

In the second trial signal, the TRIAL GENERATION routine deals with non-null sequences S1 and S3 in the same manner, but separately, with each of S1 and S3 being the subject of a call to OUTPUT STRING GENERATION. Whichever of the two trial signals is shorter is used as the signal for that triplet.

The OUTPUT STRING GENERATION routine may be designed to test each sequence for multiple consecutive occurrences of the same character, and in such event to utilize a repeat-to-address command in lieu of the multiple occurrences. Such a test and repeat-to-address command are conventional and are not described here.

Device Display Mask

The OUTPUT STRING GENERATION routine utilizes a device display mask to take advantage of information known about the display characteristics of the peripheral device 15.

Many peripheral devices can process extended-attribute commands that designate, e.g., different colors for the screen buffer 16. Not all such devices can display all extended attributes, however. For example, a particular device may be able to accept an extended-attribute command designating the color orange for display, but may only be able actually to create a black-and-white display.

The OUTPUT STRING GENERATION routine tests for this possibility. In doing so, it looks up a device-display mask created by the SIGNAL GENERATION (INCOMING) routine. Upon receipt of an incoming signal containing a response to a query command (see QUERY SUPPRESSION routine), the SIGNAL GENERATION (INCOMING) routine builds a device-display bit mask to indicate the extended attributes, if any, that can be displayed by the particular peripheral device 15.

In writing an output string from a character sequence, the OUTPUT STRING GENERATION routine determines whether a particular character represents a command character sequence. If so, and if the sequence is an extended-attribute command, it performs an AND operation between the command and the device-display mask. The result represents those extended attributes specified by the output signal that are actually displayable at the peripheral device 15.

Creation of Substitute Signal

When optimization of screen-buffer and symbol-buffer signal components is complete, the optimizer 35 generates a substitute signal from the components created by the optimization process. A convenient way to generate a substitute signal is to scan the original signal (generated by the host unit application program 25) and, for each component part of the original signal, substitute the new component part(s) generated by the optimizer 35.

Buffer Wraparound

The substitute signal itself may be further optimized to take advantage of buffer wraparound features.

In some systems, a wraparound occurs if characters are written to the screen buffer 16 beginning near the end of the buffer, and continuing past the end: instead of being lost, the characters written past the end of the buffer are wrapped around to the beginning of the buffer. This can be advantageous in writing to the beginning of the buffer.

Ordinarily, such writing is accomplished by including a set-buffer-address command in the outgoing (or substitute) signal, designating the beginning of the buffer as the location to commence writing characters.

Consider, however, the situation where, after receipt by the peripheral device 15 of the substitute signal, both the beginning and the end of the screen buffer 16 each contain an arbitrary sequence of characters to be written. Ordinarily, two set-buffer-address commands will be generated, one to write to the The optimizer 35 takes advantage of buffer wraparound capability by testing whether the above situation exists. If so, the substitute signal is altered so that the first set-buffer-address command in the signal is removed, and the characters to be written to the beginning of the buffer are moved within the signal to follow the characters to be written to the end of the buffer.

The beginning characters will thus be written to the "end" of the buffer, but will wrap around to the beginning. The size of the substitute signal is consequently reduced by the size of the set-buffer-address designating the beginning of the buffer.

This approach can be particularly advantageous when both the end and the beginning of the screen buffer 16 contain runs of identical characters, perhaps with neither separate run being big enough to justify compression using a repeat-to-address command. By utilizing the wraparound feature, a repeat-to-address command may be usable where it was not before.

Signal Routing

After completion of the foregoing signal processing, the substitute signal generated by the optimizer 35 is delivered to the signal routing unit 30 for routing to the peripheral device 15.

It will be appreciated by those skilled in the art having the benefit of this disclosure that this invention is believed to be capable of application in other situations in which the hardware and software work in substantially the same way to achieve essentially the same result. Some of these situations have been expressly described here (as examples and not as limitations), and others will be recognized by those of skill. Accordingly, this description is to be construed as illustrative only and as for the purpose of teaching those skilled in the art the manner of carrying out the invention.

It is also to be understood that various modifications and changes may be made, e.g., in the shape, size, and arrangement of components, operating steps, and so forth, without departing from the spirit and scope of the invention as set forth below in the claims.

For example, on some computer systems it may be preferable from a cost-effectiveness standpoint to adapt preexisting macros or modules to accomplish the functions described here, albeit perhaps in a different order than described.

Or, in some circumstances it may be desired to implement the system in conjunction with an existing computer program system of another type, with the possible result that the functions described here may be merged with other functions.

The system described here is organized in various routines; on some computer systems, it may be preferable to implement the system's functions through the use of, e.g., macros to avoid the overhead associated with a subroutine call.

It is intended that the following claims be interpreted to embrace all such modifications and changes.

Appendix 1

TABLE OF CONTENTS

1. TABLE OF CONTENTS

2. MAIN (OUTGOING) routine
3. INITIALIZATION (OUTGOING) routine
4. QUERY SUPPRESSION routine
5. READ BUFFER SUPPRESSION routine 6. SYMBOL BUFFER COMMAND PROCESSING routine
7. INIT SYMBOL BUFFER routine
8. UPDATE SYMBOL BUFFER routine
9. SYMBOL BUFFER OPTIMIZATION routine
10. MULTI-PASS COLOR SCHEME data structure
11. DIFFERENCE SCAN (SYMBOL) routine
12. COLOR-MATCHED SYMBOL TEST routine 13. SCREEN BUFFER COMMAND PROCESSING routine
14. INIT SCREEN BUFFER (OUTGOING) routine
15. UPDATE SCREEN BUFFER (OUTGOING) routine
16. IMAGE ALTERATION routine
17. BLANK-TO-NULL CONVERSION routine
18. DARK FIELD ELIMINATION routine
19. FIELD MERGE routine
20. DEVICE-SPECIFIC ATTRIBUTE ELIMINATION routine
21. NULL FIELD ATTRIBUTE ELIMINATION routine
22. RESET-MDT VOTING routine 23. SIGNAL GENERATION (OUTGOING-SCREEN) routine
24. MDT-RESET VOTE COUNT routine
25. TEST SIGNAL routine
26. NULL/NON-NULL STRING DELIMITATION routine
27. TRIAL GENERATION routine
28. OUTPUT STRING GENERATION routine 29. MAIN (INCOMING) routine
30. SIGNAL GENERATION (INCOMING) routine Appendix 2

MAIN (OUTGOING) routine

For each outgoing signal:

A. Get outgoing signal

B. Perform INITIALIZATION (OUTGOING) routine

C. Perform QUERY SUPPRESSION routine

D. Perform READ BUFFER SUPPRESSION routine

E. Perform SYMBOL BUFFER COMMAND PROCESSING routine

F. Perform SCREEN BUFFER COMMAND PROCESSING routine

G. Generate substitute signal from Substitute-Signal data structure and pass to signal routing unit

H. (END)

Appendix 3

INITIALIZATION (OUTGOING) routine

[Called from MAIN (OUTGOING) routine]

A. Identify session associated with signal

B. IF-THEN-ELSE test: Is the type of peripheral device in use by the session already known?

1) Yes: Look up type of peripheral device in use by session

2) No: Interrogate the peripheral device as to its type, save response

C. IF-THEN-ELSE test: Is the type of peripheral device in use by the session one for which a device driver is available?

1) Yes: Retrieve device-driver information associated with peripheral device

2) No: Branch to error-handler

D. RETURN

Appendix 4

QUERY SUPPRESSION routine

[Called from MAIN (OUTGOING) routine]

A. IF-THEN-ELSE test: Does outgoing signal include any query commands (QC)?

1) Yes:

IF-THEN-ELSE test: Is Query-Already-Completed flag set?

a) Yes:

1) Save contents of QC

2) Set Query-Sent flag

3) Write minimal query command MQC to Substitute-Signal data structure

4) RETURN b) No (Query-Already-Completed flag cleared):

1) Write QC to Substitute-Signal data structure

2) RETURN

2) No (no query command in outgoing signal): RETURN

Appendix 5

READ BUFFER SUPPRESSION routine

[Called from MAIN (OUTGOING) routine]

A. IF-THEN-ELSE test: does outgoing signal include a read-entire-buffer command RBC?

1) Yes:

a) Set Read-Buffer flag b) Write Read-Modified-Buffer command to Substitute-Signal data structure 2) No: Continue

B. RETURN

Appendix 6

SYMBOL BUFFER COMMAND PROCESSING routine

If outgoing signal includes any symbol-buffer modification commands:

A. Perform INIT SYMBOL BUFFER routine

B. For each symbol-buffer modification command, perform UPDATE SYMBOL BUFFER routine C. For each designated color in COLOR PASS data structure, perform SYMBOL BUFFER OPTIMIZATION routine for that designated color, thereby add to Substitute-Signal data structure

D. RETURN

Appendix 7

INIT SYMBOL BUFFER routine

[Called from MAIN (OUTGOING) routine]

A. IF-THEN-ELSE test: Do Present (Symbol) map(s) exist for this session?

1) Yes: Retrieve Present (Symbol) map(s) for session

2) No: Create null Present (Symbol) map(s) for session by allocating free storage B. Create Intended (Symbol) map(s) by copying Present (Symbol) map(s) to free storage

C. RETURN

Note: If peripheral device supports multiple color-plane (e.g., separate red, green, blue) symbol buffers, one Present (Symbol) and one Intended (Symbol) map is created/retrieved for each color plane Appendix 8

UPDATE SYMBOL BUFFER routine

A. Get symbol-modifying command SMC

B. Parse SMC:

1) Determine from SMC contents which symbol buffer(s) are to be modified

2) Determine from SMC contents the location(s) L, in the respective symbol buffer(s), of symbols to be modified C. For each location L:

1) Locate position P in Intended (Symbol) map(s) corresponding to location L

2) Modify contents of Intended (Symbol) map(s) at location P in accordance with modification instructions of SMC

D. RETURN

Appendix 9

SYMBOL BUFFER OPTIMIZATION routine

[Called from MAIN (OUTGOING) routine]

A. Go to beginning of MULTI-COLOR PASS SCHEME data structure

B. While more designated pass colors remain in MULTI-COLOR PASS SCHEME data structure:

1) Get next designated pass color

2) Designate Intended (Symbol) and Present (Symbol) maps for the principal color attribute corresponding to that designated pass color as the Intended (Principal Color) and Present (Principal Color) maps 3) Designate Intended (Symbol) and Present (Symbol) maps for any secondary color attributes corresponding to that designated pass color as Intended (Secondary Color) and Present (Secondary Color) maps 4) Label maps so designated as Designated Color maps 5) Perform DIFFERENCE SCAN (SYMBOL) routine 6) Continue [step B]

E. RETURN

Appendix 10

MULTI-PASS COLOR SCHEME data structure

Multi-record data structure of color attributes for triple-plane, dual-plane, and single-plane SYMBOL BUFFER OPTIMIZATION passes.

| Desig. Color for Pass | Principal Color Attribute | Sec. Color Attribute |
|---|---|---|
| White | Blue | Red, Green |
| Turquoise | Blue | Green |
| Yellow | Red | Green |
| Pink | Red | Blue |
| Blue | Blue | (none) |
| Red | Red | (none) |
| Green | Green | (none) |

Appendix 11

DIFFERENCE SCAN (SYMBOL) routine

[Called from SYMBOL BUFFER OPTIMIZATION routine]

A. Go to beginning of Designated Color maps

B. While more symbols remain in the Designated Color maps:

1) Get next symbols SD from Intended (Principal Color) and Present (Principal Color) maps, note location in maps as LD 2) IF-THEN-ELSE test: are SDs in Intended (Principal Color) and Present (Principal Color) maps identical?

a) Yes (no change to be made): Continue [step B]

b) No (change to be made):

1) Perform COLOR-MATCHED SYMBOL TEST routine on Designated Color maps -- test for whether change is to be made on this pass 2) If COLOR-MATCHED SYMBOL TEST returned designation of a color-matched map segment CMMS:

a) Write a command to the Substitute-Signal data structure to cause downloading to peripheral device symbol buffer, in the designated pass color, of symbols contained, at map segment CMMS, in the Intended (Symbol) map b) Overwrite map segment CMMS of all Present (Symbol) maps with corresponding symbols from Intended (Symbol) maps c) Move scan pointer (in Intended (Primary Color) and Present (Primary Color) maps) ahead to end of map segment CMMS 3) Continue [step B]

C. RETURN

Appendix 12

COLOR-MATCHED SYMBOL TEST routine

[Called from DIFFERENCE SCAN (SYMBOL) routine]

IF-THEN-ELSE test: are contents of Intended (Primary Color) map at location LD identical only to contents of any Intended (Secondary Color) maps at location LD, and not identical to any other Intended (Symbol) maps?

A. Yes (designated pass color match - make change on this pass):

1) Label location LD as beginning of color-matched map segment CMMS

2) Scan ahead in all Intended (Symbol) maps to locate a symbol that is either color-mismatched with the designated pass color or is both color- and content- matched with the Present (Symbol) maps, i.e. a symbol that either (i) is not a symbol of the designated pass color, or (ii) is a symbol of the designated pass color, but matches the corresponding symbol in the Present (Symbol) maps, and the corresponding symbol is also of the designated pass color 3) Designate location of symbol so located as LE 4) Calculate length of CMMS as number of symbols between LD (inclusive) and LE (exclusive)

5) RETURN length of CMMS

B. No: RETURN

Appendix 13

SCREEN BUFFER COMMAND PROCESSING routine

[Called from MAIN (OUTGOING) routine]

If outgoing signal includes any screen-buffer modification commands:

A. Perform INIT SCREEN BUFFER (OUTGOING) routine to get Present (Screen) and Intended (Screen) maps B. Perform UPDATE SCREEN BUFFER (OUTGOING) routine upon Intended (Screen) map for each screen-buffer modification command C. Make copy of Intended (Screen) map, save copy to storage as Saved (Screen) map D. Perform IMAGE ALTERATION (OUTGOING) routine upon Intended (Screen) map

E. RETURN

Appendix 14

INIT SCREEN BUFFER (OUTGOING) routine

[Called from SCREEN BUFFER COMMAND PROCESSING routine]

A. IF-THEN-ELSE test: Does Saved (Screen) map exist for this session (i.e., was a previous outgoing or incoming signal processed)?

1) Yes: Retrieve a copy of Saved (Screen) map for session and rename copy as Present (Screen) map 2) No: Create null Present (Screen) map for session by allocating free storage B. Create Intended (Screen) map by copying Present (Screen) buffer to free storage C. IF-THEN-ELSE test: Are any image-alteration flags set for session (see subroutines called by IMAGE ALTERATION routine)?

1) Yes:

a) Perform the IMAGE ALTERATION (OUTGOING) subroutine(s) that correspond to the set flags, to alter the Present (Screen) map b) Clear the image-alteration flags for the session 2) No: Continue

D. RETURN

Appendix 15

UPDATE SCREEN BUFFER (OUTGOING) routine

[Called from MAIN (OUTGOING) routine]

A. Get screen-buffer-modifying command SBMC from signal

B. Determine location L in screen buffer of character(s) to be modified as a result of SBMC C. Locate position P in Intended (Screen) map corresponding to location L D. Go to beginning of SBMC E. Modify contents of Intended (Screen) map at location P in accordance with modification instructions of SBMC, translating any commands or orders embedded in SBMC into nonprotocol characters

F. RETURN

Appendix 16

IMAGE ALTERATION routine

[Called from MAIN (OUTGOING) routine]

A. Perform BLANK-TO-NULL CONVERSION routine

B. Perform DARK FIELD ELIMINATION

C. Perform FIELD MERGE routine

D. Perform DEVICE-SPECIFIC ATTRIBUTE ELIMINATION routine

E. Perform NULL FIELD ATTRIBUTE ELIMINATION routine

F. Perform RESET-MDT VOTING routine

G. RETURN

NOTE: All routines above may be performed on a single pass through the Intended (Screen) or Present (Screen) map to save processing time Appendix 17

BLANK-TO-NULL CONVERSION routine

[Called from the IMAGE ALTERATION routine]

A. Go to beginning of map

B. While more protected fields remain in map:

1) Scan map to locate next protected field

2) Convert all blank characters in protected field to null characters; ensure that no screen-image lines which contained blanks are converted entirely to nulls 3) If any blank characters were converted, set Image-Alteration (Blank to Null) flag 4) Continue [step B]

C. RETURN

Appendix 18

DARK FIELD ELIMINATION routine

[Called from IMAGE ALTERATION routine]

A. Scan map for attribute character sequence (PDFCS) designating protected "dark" field B. For each protected dark field found:

1) Note the first character following the PDFCS as the beginning location of a protected dark field 2) Scan ahead in map for the next field attribute character sequence, delimiting the end of the dark field 3) Overwrite dark field with nulls 4) Set Image-Alteration (Dark Field) flag 5) Continue scan [step A]

C. RETURN

Appendix 19

FIELD MERGE routine

[Called from IMAGE ALTERATION routine]

A. Initialize Attribute-Previous data structure to indicate beginning-of-map (i.e., no attribute)

B. Set pointer to beginning of map

C. Scan map (moving the pointer as scan progresses) to locate next field attribute character sequence (FACS)

D. For each FACS found:

1) Designate as Attribute-Current the attribute value of the FACS

2) IF-THEN-ELSE test (two-part):

Is Attribute-Current equal to the attribute value of Attribute-Previous, and

Does Attribute-Current designate a protected field?

a) Yes:

1) Overwrite the map to eliminate the field attribute character sequence designated by Attribute-Current 2) Set Image-Alteration (Field Merge) flag 3) Continue [step C]

b) No:

1) Make Attribute-Current the new Attribute-Previous

2) Continue [step C]

E. RETURN

Appendix 20

DEVICE-SPECIFIC ATTRIBUTE ELIMINTATION routine

[Called from IMAGE ALTERATION routine]

A. Go to beginning of map

B. While more fields remain in map:

1) Scan map to locate next field

2) Overwrite field attribute(s) with null character(s)

3) If any field attributes were overwritten, set Image-Alteration (Device-Specific) flag 4) Continue [step B]

C. RETURN

Appendix 21

NULL FIELD ATTRIBUTE ELIMINATION routine

[Called from IMAGE ALTERATION routine]

A. Initialize Attribute-Previous data structure to indicate beginning-of-map

B. Initialize Attribute-Current data structure and set All-Nulls flag

C. Set pointer to beginning of map

D. Scan map (moving the pointer as scan progresses) to locate next field attribute character sequence (or end-of-map indicator)

E. If nonnull or nonspace character is detected during scan, clear All-Nulls flag F. When field attribute character sequence (or end-of-map indicator) is found:

IF-THEN-ELSE test: is the All-Nulls flag set?

1) Yes:

IF-THEN-ELSE test: does the Attribute-Previous data structure still indicate beginning-of-map?

a) Yes: Continue [step D]

b) No:

1) Overwrite map to eliminate field attribute character sequence represented by Attribute-Previous 2) Set Image-Alteration (Null Field Attribute Elimination) flag 3) Make Attribute-Current the new Attribute-Previous 2) No: Reset All-Nulls flag and continue (step D)

G. RETURN

Appendix 22

RESET-MDT VOTING routine

[Called from IMAGE ALTERATION (OUTGOING) routine]

A. Initialize Reset-Vote counter and NoReset-Vote counter at zero value

B. SWITCH test:

1) Compare each field attribute in Intended (Screen) map with corresponding field attribute in Present (Screen) map (i.e., determine what if any state change has occured)

2) For each such field attribute, increment the Reset-Vote or NoReset-Vote counter in accordance with the following table:

| CASE: | | | ACTION: |
|---|---|---|---|
| Field attr. in Present (Screen) map AND | Field attr. in Intended (Screen) map | THEN | Increment Which Counter? |
| Premodified | Unpremodified | | Reset-Vote |
| Premodified | Premodified | | NoReset-Vote |
| Unpremodified | Unpremodified | | (none) |
| Unpremodified | Premodified | | NoReset-Vote |

C. RETURN

Appendix 23

SIGNAL GENERATION (OUTGOING-SCREEN) routine

[Called from MAIN (OUTGOING) routine]

A. Perform MDT-RESET VOTE COUNT routine

B. Set Erase-Buffer flag

C. Perform TEST SIGNAL routine, utilizing Intended (Screen) map as operand, to generate New-Signal (Erase Yes) data structure D. Clear Erase-Buffer flag E. If Use-Reset flag is set, write an MDT-reset command to the Substitute-Signal data structure F. Exclusive-or (XOR) the Intended (Screen) map onto the Present (Screen) map to generate a Difference (Screen) map G. Perform TEST SIGNAL routine, utilizing both Difference (Screen) and Intended (Screen) maps as operands, to generate New-Signal (Erase No) data structure H. Write the shorter of the two test signals (from the New-Signal (Erase) and New-Signal (No Erase) data structures) to the Substitute-Signal data structure

I. RETURN

Appendix 24

MDT-RESET VOTE COUNT routine

[Called from SIGNAL GENERATION (OUTGOING-SCREEN) routine]

IF-THEN-ELSE test: Reset-Vote > NoReset-Vote?

A. Yes:

1) Set Use-Reset flag

2) Scan Present (Screen) map, change all "premodified" field attribute character sequences to "unpremodified" field attribute character sequence COMMENT: Step A(2) --> any premodified field attributes in the Intended (Screen) map will automatically mismatch against the Present (Screen) map upon XOR (see SCREEN BUFFER COMMAND PROCESSING routine), and thus be guaranteed to generate a nonnull character in the Difference (Screen) map (see SIGNAL GENERATION (OUTGOING-SCREEN) routine B. No:

1) Clear Use-Reset flag

2) Scan Present (Screen) map, change all "premodified" field attribute character sequences to the in-doubt character COMMENT: Step B(2) forces a mismatch on all premodified field attributes --> any "left-over" premodified fields at the device screen buffer will be turned off by the outgoing signal, even though they remain unchanged from the previous incoming signal Appendix 25

TEST SIGNAL routine

[Called from SIGNAL GENERATION (OUTGOING - SCREEN) routine]

A. IF Erase-Buffer flag is set:

1) THEN use Intended (Screen) map as Scan map;

2) ELSE use Difference (Screen) map as Scan map

B. While more non-null characters remain in Scan map:

1) Scan forward in Scan map, locate next non-null character

COMMENT: In systems supporting multiple map planes (e.g., for extended attribute bytes), a "non-null character" at a given position is one that is non-null at that position in any Scan map plane 2) Perform NULL/NON-NULL STRING DELIMITATION routine to obtain boundaries of three consecutive strings S1, S2, S3 in Scan map (string S1 beginning with the non-null character found)

3) Perform TRIAL GENERATION routine, using strings S1, S2, and S3 as operands, to write Alt-Signal 1 and Alt-Signal 2

4) Write shorter of Alt-Signal 1 and Alt-Signal 2 to Substitute-Signal data structure 5) Move scan pointer to end of string S3

6) Continue scan [step B]

C. RETURN

Appendix 26

NULL/NON-NULL STRING DELIMITATION routine

[Called by TEST SIGNAL routine]

A. Note starting address of non-null string S1 that begins with non-null character found by calling routine B. Scan ahead in Scan map for next null character; note this character as end of non-null string S1 and beginning of null string S2

COMMENT: In systems supporting multiple Scan map planes (e.g., for extended attribute bytes), a "null character" at a given position must be null at corresponding positions in all Scan map planes C. Scan ahead in Scan map for next non-null character; note this character as end of null string S2 and beginning of second non-null string S3

COMMENT: In systems supporting multiple map planes (e.g., for extended attribute bytes), a "non-null character" at a given position is one that is non-null at that position in any Scan map plane D. Scan ahead in Scan map for next null character; note this character as end of non-null string S3

E. RETURN

Appendix 27

TRIAL GENERATION routine

[Called from TEST SIGNAL routine]

A. Generate Alt-Signal 1:

1) Initialize memory for Alt-Signal 1

2) Define Scan-String as string in Intended (Screen) map corresponding to consecutive strings S1, S2, and S3 in Scan map (treated as a single concatenated string)

3) Perform OUTPUT STRING GENERATION routine, utilizing Scan-String as operand; write resulting Output-String to Alt-Signal 1

B. Generate Alt-Signal 2:

1) Initialize memory for Alt-Signal 2

2) Generate signal from first non-null string S1:

a) Define Scan-String as string in Intended (Screen) map corresponding to non-null string S1 in Scan map b) Perform OUTPUT STRING GENERATION routine, utilizing Scan-String as operand; write resulting Output-String to Alt-String 2

3) Generate signal from second non-null string S3:

a) Define Scan-String as string in Intended (Screen) map corresponding to string S3 in Scan map b) Perform OUTPUT STRING GENERATION routine, utilizing Scan-String as operand; append resulting Output-String to Alt-String 2

C. RETURN

Appendix 28

OUTPUT STRING GENERATION routine

[Called from TRIAL GENERATION routine]

A. Initialize memory for Output-String

B. Write set-buffer-address to Output-String designating address of Scan-String as location to begin writing to buffer C. While more characters remain in Scan-String:

1) Get next character C from Scan-String

2) IF-THEN-ELSE test: Is C a command code?

a) YES:

1) Translate C into corresponding command character sequence CCS

2) If CCS is an extended-attribute code, overwrite CCS with result of ANDing CCS with Device-Display mask 3) Append CCS to Output-String b) NO: Append C to Output-String 3) Continue [step C]

C. RETURN

Appendix 29

MAIN (INCOMING) routine

For each incoming signal:

A. Get incoming signal

B. Locate Saved (Screen) map associated with session

C. Apply incoming signal to Previous (Screen) map to generate Present (Screen) map;

All command or order character sequences to be represented in Present (Screen) map as unique symbols D. Perform SIGNAL GENERATION (INCOMING) routine E. Generate substitute signal from Substitute-Signal data structure and pass substitute signal to host unit F. Save Present (Screen) map for future reference

G. END

Appendix 30

SIGNAL GENERATION (INCOMING) routine

A. IF-THEN-ELSE test: Does incoming signal include a reply QCR to a query command (QC or MQC - see QUERY SUPPRESSION routine)?

1) Yes:

a) IF-THEN-ELSE test: Is Query-Already-Completed flag set?

1) Yes: Continue

2) No:

a) Copy QCR to Query-Reply data structure
  b) Set Query-Already-Completed flag
  c) Build and save Device-Display mask for later use b) Write contents of Query-Reply data structure to Substitute-Signal data structure 2) No: Continue B. IF-THEN-ELSE test: Is Read-Buffer flag (see READ BUFFER SUPPRESSION routine) set?

1) Yes:

a) Perform OUTPUT STRING GENERATION routine, utilizing entire contents of Intended (Screen) map as Scan-String b) Write resulting Output-String to Substitute-Signal data structure 2) No: While more modified fields remain in Intended (Screen) map – a) Get contents of next modified field b) Perform OUTPUT STRING GENERATION routine, utilizing contents of modified field of Intended (Screen) map as Scan-String c) Append resulting Output-String to Substitute-Signal data structure

C. RETURN

What is claimed is:
1. A method for optimizing the transmission of an outgoing signal generated by a host unit for processing by a peripheral unit having a programmable symbol buffer,
  said symbol buffer having information contents that are organized into a plurality of "symbol slots" each of which is selectively displayable in a plurality of display colors,
  said outgoing signal including a command to write a representation of a symbol to a symbol slot in said symbol buffer,
  said method comprising the steps of:
  (a) designating one said display color as a "designated display color";
  (b) maintaining a present-state map of the information contents of the symbol buffer;
  (c) accessing said outgoing signal;
  (d) generating an updated-state map of the information contents of said symbol buffer expected to exist if said outgoing signal were to be processed by the peripheral unit;
  (e) scanning said present-state map and said updated-state map in search of a "hit" symbol slot (1) that is selected for display in said designated display color, and (2) at which the information contents of said present-state map and said updated-state map are nonidentical;
  (f) writing, to a substitute outgoing signal, a command to download to the peripheral unit symbol buffer a representation of the symbol stored in the updated-state map at the hit symbol slot, in the designated display color; and
  (g) overwriting the present-state map at the hit symbol slot with the information contents of the corresponding updated-state map at the hit symbol.

2. A method for optimizing the transmission of an outgoing signal generated by a host unit for processing by a peripheral unit having a programmable symbol buffer, said symbol buffer having information contents that are organized into a plurality of "symbol slots" each of which is selectively displayable in a plurality of display colors, said outgoing signal including a command to write a representation of a symbol to a symbol slot in said symbol buffer, said method comprising the steps of:
  (a) designating one said display color as a "designated display color";
  (b) maintaining a present-state map of the information contents of the symbol buffer;
  (c) accessing said outgoing signal;
  (d) generating an updated-state map of the information contents of said symbol buffer expected to exist if said outgoing signal were to be processed by the peripheral unit;
  (e) scanning said present-state map and said updated-state map in search of a "begin-hit" symbol slot (1) that is selected for display in said designated display color, and (2) at which the information contents of said present-state map and said updated-state map are nonidentical;
  (f) continuing to scan said present-state map and said updated-state map in search of an "end-hit" symbol slot, namely a slot immediately preceding a slot (i) that is not selected for display in said designated display color, or (ii) at which the information contents of said present-state map and said updated-state map are identical;
  (g) defining a "hit" symbol-slot sequence in each of said present-state map and said updated-state map, comprising the respective symbol slots in each said map between the begin-hit symbol slot and the end-hit symbol slot, inclusive;
  (h) writing to a substitute outgoing signal a command to download, to the peripheral unit symbol buffer, representations of the symbols stored in the updated-state map in the hit symbol-slot sequence; and
  (i) overwriting the hit symbol-slot sequence of the present-state map with the respective information contents of the hit symbol-slot sequence of the updated-state map.

3. A method comprising seven iterations of the method of claim 2 in which the designated display colors for the respective iterations are white, turquoise, yellow, pink, blue, red, and green, respectively.

4. A method for optimizing the transmission of an outgoing signal generated by a host unit for processing by a peripheral unit having a programmable symbol buffer, said symbol buffer having information contents organized into a plurality of "symbol slots" and into a plurality of "color planes,"

each said color plane representing a "component color," said component colors being combinable into "display colors,"

said outgoing signal including a command to write a representation of a symbol to a symbol slot in said symbol buffer, said method comprising the steps of:
  (a) designating a display color as a "designated display color";
  (b) designating a component color of said designated display color as a "principal component color";
  (c) if said designated display color includes component colors other than said principal component color, then designating said other component colors as "secondary component colors";
  (d) maintaining a present-state map of the information contents of the symbol buffer;
  (e) accessing said outgoing signal;
  (f) generating an updated-state map of the information contents of said symbol buffer expected to exist if said outgoing signal were to be processed by the peripheral unit,
  (g) said present-state map and said updated-state map including respective "map color planes" corresponding to said component colors;
  (h) said map color planes corresponding to said principal component color being designated as "principal map color planes" and any map color planes corresponding to any said secondary color component being designated as "secondary map color planes";
  (i) each said map color plane being organized into a plurality of symbol slots corresponding to the symbol slots of the symbol buffer;
  (j) scanning said present-state principal map color plane and said updated-state principal map color plane in search of a "hit" symbol slot at which the information contents of said present-state principal map color plane and said updated-state principal map color plane are nonidentical;
  (k) if said updated-state principal map color plane (1) satisfies the following two conditions: is identical, at the hit symbol slot, to any designated updated-state secondary map color planes at the hit symbol slot, and (2) is not identical to any other updated-state map color planes at the hit symbol slot, then
    (i) writing, to a substitute outgoing signal, a command to download to the peripheral unit symbol buffer a representation of the symbol stored in the updated-state map at the hit symbol slot, in the designated display color; and
    (ii) overwriting all present-state map color planes at the hit symbol slot with the information contents of the corresponding updated-state map color planes at the hit symbol.

5. A method for optimizing the transmission of an outgoing signal generated by a host unit for processing by a peripheral unit having a programmable symbol buffer, said symbol buffer having information contents organized into a plurality of "symbol slots" and into a plurality of "color planes,"

each said color plane representing a "component color," said component colors being combinable into "display colors,"

said outgoing signal including a command to write a representation of a symbol to a symbol slot in said symbol buffer, said method comprising the steps of:
  (a) designating a display color as a "designated display color";

(b) designating a component color of said designated display color as a "principal component color";

(c) if said designated display color includes component colors other than said principal component color, then designating said other component colors as "secondary component colors";

(d) maintaining a present-state map of the information contents of the symbol buffer;

(e) accessing said outgoing signal;

(f) generating an updated-state map of the information contents of said symbol buffer expected to exist if said outgoing signal were to be processed by the peripheral unit, (g) said present-state map and said updated-state map including respective "map color planes" corresponding to said component colors;

(h) said map color planes corresponding to said principal component color being designated as "principal map color planes" and any map color planes corresponding to any said secondary color component being designated as "secondary map color planes";

(i) each said map color plane being organized into a plurality of symbol slots corresponding to the symbol slots of the symbol buffer;

(j) scanning said present-state principal map color plane and said updated-state principal map color plane in search of a "hit" symbol slot at which the information contents of said present-state principal map color plane and said updated-state principal map color plane are nonidentical;

(k) if said updated-state principal map color plane satisfies the following two "hit" conditions: (1) said map is identical, at the hit symbol slot, to any designated updated-state secondary map color planes at the hit symbol slot, and (2) said map is not identical to any other updated-state map color planes at the hit symbol slot, then:

(i) designating a location LD, namely the location of said hit symbol slot;

(ii) scanning ahead in all map color planes in search of a location LE at which one of the following is true: (A) either of said "hit" conditions (1) or (2) is no longer true, or (B) both said "hit" conditions (1) and (2) remain true, but the information contents of said present-state principal map color plane and said updated-state principal map color plane are identical;

(iii) writing, to a substitute outgoing signal, a command to download to the peripheral unit symbol buffer a representation of the symbols stored in the updated-state map from (and including) location LD to (but excluding) location LE; and (iv) overwriting all present-state map color planes between locations LD (inclusive) and LE (exclusive) with the information contents of the corresponding updated-state map color planes between those locations LD and LE.

6. A method for optimizing the transmission of an outgoing signal generated by a host unit for processing by a peripheral unit having a buffer, said buffer having information contents logically divisible into one or more fields by writing one or more field attribute bytes to the symbol buffer, said field attribute byte having a modified data tag (MDT) having SET and CLEARED states, said SET state defining a modified field and said CLEARED state defining an unmodified field, said outgoing signal being organized according to a protocol wherein an MDT in a field attribute byte may be pre-set to define a premodified field, said peripheral unit having circuitry means for constructing a data stream comprising the contents of modified fields, said method comprising the steps of:

(a) maintaining a present-state map of the contents of the information buffer;

(b) accessing said outgoing signal;

(c) generating an updated-state map of the information contents of the symbol buffer expected to exist if said outgoing signal were to be processed by the peripheral unit;

(d) comparing a present-state field attribute byte in said present-state map with a corresponding updated-state field attribute byte in said updated-state map;

(e) incrementing a NoResetMDT counter if the MDT in said updated-state field attribute byte is premodified;

(f) incrementing a ResetMDT counter if the MDT in said present-state field attribute byte is premodified and if the MDT in the updated-state field attribute byte is unpremodified; and (g) else incrementing neither the ResetMDT counter nor the NoResetMDT counter.

7. The method of claim 6, further comprising the steps of:

(h) comparing the respective counts stored in said ResetMDT counter and said NoResetMDT counter;

(i) if ResetMDT>NoResetMDT, then overwriting a present-state field attribute byte in which the MDT is SET with a similar field attribute byte in which the MDT is CLEARED;

(j) else overwriting said present-state field attribute byte in which the MDT is SET with an in-doubt character.

8. The method of claim 7, further comprising the step of transmitting a substitute outgoing data stream to the peripheral unit, said substitute outgoing data stream including a command to reset to said CLEARED state all clearable MDTs in the peripheral unit's buffer if ResetMDT>NoResetMDT.

* * * * *

UNITED STATES PATENT AND TRADEMARK OFFICE
CERTIFICATE OF CORRECTION

PATENT NO. : 5,046,025

DATED : September 3, 1991

INVENTOR(S) : Thomas A. Harper and Philip V. Wiles, Jr.

It is certified that error appears in the above-identified patent and that said Letters Patent is hereby corrected as shown below:

Column 12, line 25, after the words "one to write to the", please add -- end.--

Signed and Sealed this

Second Day of February, 1993

Attest:

STEPHEN G. KUNIN

*Attesting Officer*  *Acting Commissioner of Patents and Trademarks*